March 26, 1940.   G. A. ALLEN   2,194,538
MOLD
Filed April 28, 1938

Inventor
George A. Allen
By
Finckel & Finckel
Attorneys

Patented Mar. 26, 1940

2,194,538

UNITED STATES PATENT OFFICE 2,194,538

MOLD

George A. Allen, Lancaster, Ohio, assignor to Anchor Hocking Glass Corporation, Lancaster, Ohio, a corporation of Delaware Application April 28, 1938, Serial No. 204,811

2 Claims. (Cl. 49—72)

This invention relates generally to molds for making glass articles and especially such as plates or dishes as have concentric ribs or flutings.

In the molding of such articles, it has been found that when the plunger comes down on the lump of hot glass the air between mold and the pressed glass does not entirely escape and forms bubbles or other defects in the finished article.

An object of the invention is to provide a construction of mold whereby the air between the glass and the mold is vented and the pressed glass produced in more satisfactory condition.

Another object of the invention is to provide a construction whereby such a mold can be produced at comparatively small cost.

Further objects of the invention will appear from the disclosure herein.

The invention is embodied in the construction herein shown and described the feature of novelty being finally claimed.

In the accompanying drawing—

Figure 1:
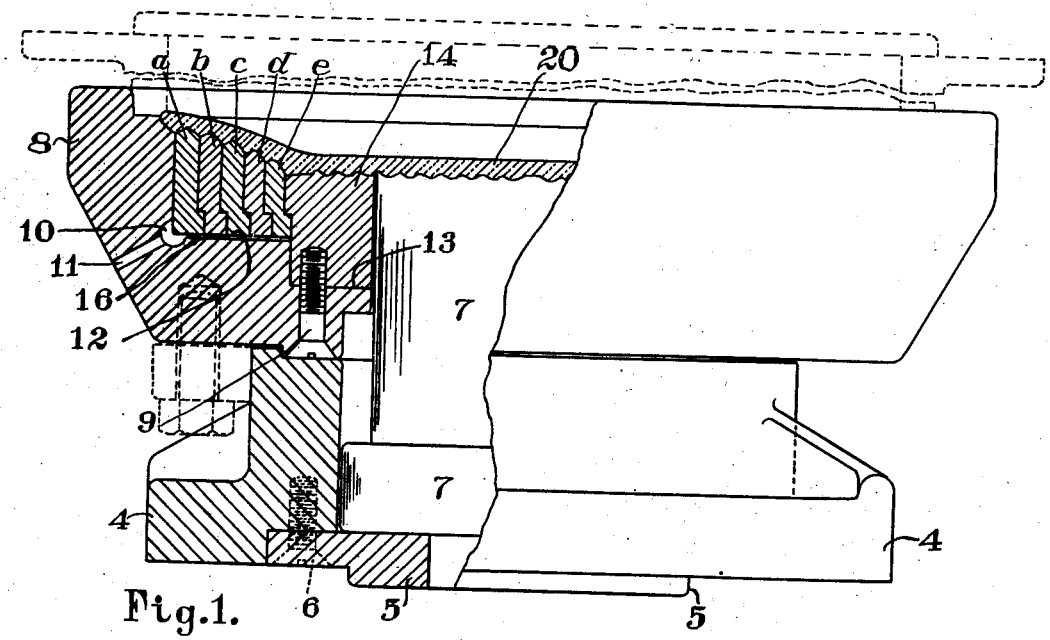
Figure 1 is a partial vertical section on line I—I, Fig. 2.
Figure 2:
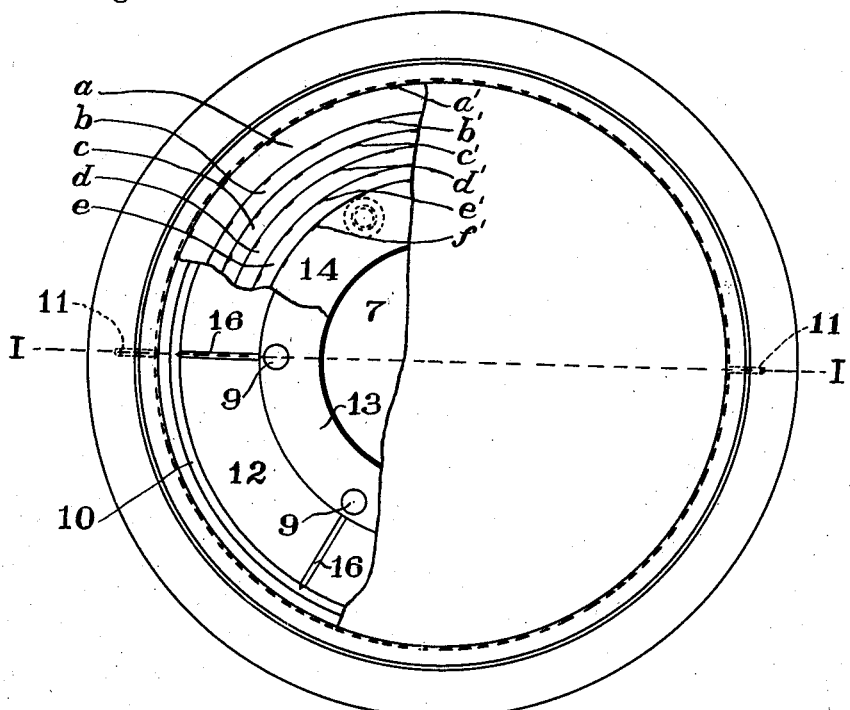
Fig. 2 is a top plan view with parts broken out to illustrate details below.

In the views 4 designates the base of the mold and 5 a ring-like cover for the central opening of the base, said cover connected with the base ring by set screws 6 at several points around the base. Supported by said cover 5 is cylindrical block 7 having formed at its upper end the design for molding the central portion of the ware at its lower side. A function of the block 7 is to support the ware in elevated position for removal of the ware when the mold is lowered.

The character 8 designates a body ring superposed on the upper end of the base 4 and secured thereto by bolts at 9 to lugs on the base. The said ring 8 has a channel 10 extending entirely around it with discharge passages 11 at suitable intervals to the exterior of the mold.

The said ring 8 also has annularly two seats 12 and 13, the upper one designated 12, to support a concentric series $a$, $b$, $c$, $d$ and $e$, of rings of graduated height having their upper edges patterned to form the molding surfaces of the lower side of the flared portion of the glass plate, designated 20; and the lower seat 13 to support a relatively thick ring 14 having its upper surface, if desired, patterned to supplement the central design at the upper end of the block 7. The members $a$, $b$, $c$, $d$ and $e$ of the series of rings referred to are each suitably shouldered to interengage or as shown so that they can be placed on their seat 12 from the outermost to the innermost of them. After having been placed as just described, the shoulder of the innermost ring $e$ is engaged by a complementary shoulder on the thick ring 14, said ring being held in the said engaging position by the several set screws 9 connecting it with the body ring 8. When so secured, all the rings are held from movement or removal until the set screws 9 are removed.

In practice the series of concentric rings have very slight clearance vertically between them but not sufficient to cause any marring of the glass in the molded article. To facilitate the rapid escape of air between the nested rings, they and ring 14 can each be provided at intervals with transverse or vertical very shallow grooves such as indicated at $a'$, $b'$, $c'$, etc. In the seat 12 on which the series of rings $a$, $b$, $c$, $d$ and $e$ is supported are cut several radial or transverse channels 16 leading into the annular channel 10 so that air pocketed between the glass and the mold when the plunger is brought down to press the molten glass escapes through the series of grooves $a'$ to $f'$ inclusive, on the rings and the ring 14 and into said channels 16 and thence to the atmosphere through the discharge 11.

In the drawing is illustrated a glass plate having its flutings or ribs prismatic in cross section which by refraction or other cause adds a silvery effect to the plate when viewed in the proper light at the upper side thereof. It will be observed that in such form of fluting, the inner face thereof slants upward and naturally offers some obstruction to the flow outward of air from between the mold and the glass being pressed. But by the present construction of mold, marring of the ware with bubbles or other defects caused by entrapped air is avoided. Moreover the base and the body ring can be made of a relatively cheap cast metal and the molding members or their molding surfaces of the best quality of cast metal.

The forms, size and number of the parts can be changed without departing from the gist of the invention as claimed.

What I claim is:

1. In a mold for forming refracting concentric ribs or fluting on the lower face of a glass dish or the like the combination of a base, a body ring superposed on said base and having an upper and a lower annular seat, a series of nested mold rings of graduated heights provided with interengaged annular shoulders, said nested mold rings resting on said upper seat, and a relatively thick ring resting on said lower seat and removably secured to said body ring, said relatively thick ring provided with a shoulder engaging the innermost of the aforesaid nested rings to retain said rings on their seat, said rings provided with air venting passages.

2. In a mold for forming refracting concentric ribs or fluting on the lower face of a glass dish or the like the combination of a base, a body ring superposed on said base and having an upper and a lower annular seat, a series of nested mold rings of graduated heights provided with interengaged annular shoulders, said nested mold rings resting on said upper seat, and a relatively thick ring resting on said lower seat and removably secured to said body ring, said relatively thick ring provided with a shoulder engaging the innermost of the aforesaid nested rings to retain said rings on their seat, and a central glass molding block movably supported within the aforesaid relatively thick ring to support the molded ware upon relative vertical movement of said parts, said rings provided with air venting passages.

GEORGE A. ALLEN.